United States Patent
Xu et al.

(10) Patent No.: US 8,655,171 B2
(45) Date of Patent: Feb. 18, 2014

(54) METHOD AND DEVICE FOR OPTICAL POWER BUDGET IN PASSIVE OPTICAL NETWORK

(75) Inventors: Jidong Xu, Shenzhen (CN); Boshan Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 104 days.

(21) Appl. No.: 13/381,122

(22) PCT Filed: Jun. 11, 2010

(86) PCT No.: PCT/CN2010/073821
§ 371 (c)(1), (2), (4) Date: Dec. 28, 2011

(87) PCT Pub. No.: WO2010/145500
PCT Pub. Date: Dec. 23, 2010

(65) Prior Publication Data
US 2012/0106952 A1    May 3, 2012

(30) Foreign Application Priority Data
Jun. 29, 2009    (CN) ............................. 200910150680

(51) Int. Cl.
H04B 10/08    (2011.01)
H04B 17/00    (2006.01)

(52) U.S. Cl.
USPC ............................................. 398/38; 398/28

(58) Field of Classification Search
None
See application file for complete search history.

(56) References Cited

FOREIGN PATENT DOCUMENTS

| | | |
|---|---|---|
| CN | 1767416 A | 5/2006 |
| CN | 101247182 A | 8/2008 |
| WO | 2008038981 A1 | 4/2008 |

OTHER PUBLICATIONS

Zhu et al, "GPON reach extension to 60 km with entirely passive fibre plant using Raman amplification"(Published in 35th European Conference on Optical Communication, Sep. 2009).*
Kwon et al, "AC-Coupled Burst-Mode OLT SFP Transceiver for Gigabit Ethernet PON Systems" (Published in IEEE Photonics Technology Letters, Vol. 17, No. 7, Jul. 2005).*
Nesset et al, "10 Gbit/s Bidirectional Transmission in 1024-way Split, 110 km Reach PON System using Commercial Transceiver Modules, Super FEC and EDC" (Published in 31st European Conference on Optical Communication, Sep. 2005).*
International Search Report for PCT/CN2010/073821 dated Aug. 16, 2010.

* cited by examiner

*Primary Examiner* — Leslie Pascal
*Assistant Examiner* — Casey Kretzer
(74) *Attorney, Agent, or Firm* — Ling Wu; Stephen Yang; Ling and Yang Intellectual Property

(57) ABSTRACT

A method and a device for an optical power budget in a passive optical network are disclosed in the present invention, wherein said method includes: acquiring a corresponding minimum optical link loss according to a transmission requirement of a passive optical network with a large splitting ratio or long distance (710); selecting an optical transmitter with large power and an optical receiver with high sensitivity as a combination of an optical transmitter of an Optical Line Terminal (OLT) and an optical receiver of an Optical Network Unit (ONU) in an optical link, as well as a combination of an optical receiver of the OLT and an optical transmitter of the ONU in the optical link according to the minimum optical link loss to compose a passive optical network system comprising the OLT, an Optical Distribution Network (ODN), and ONUs connected in sequence (720).

14 Claims, 4 Drawing Sheets

METHOD AND DEVICE FOR OPTICAL POWER BUDGET IN PASSIVE OPTICAL NETWORK

TECHNICAL FIELD

The present invention relates to the optical network system in the field of communication, and more especially, to a method and a device for an optical power budget in a passive optical network (PON).

BACKGROUND OF THE RELATED ART

With the advent of the information society, online information exchange, information search, remote services, home office and telephone conferences and entertainment activities such as watching movie and TV etc. have gradually become a part of the modern life, which greatly promoted the broadband access technique to develop in a faster and wider direction. The Passive Optical Network (PON) is one of the widest, fastest and most environment-friendly broadband access techniques and is being accepted by the vast majority of operators for deploying optical fiber access systems so as to gradually replace the existing copper wire (wired) systems, that is, the trend of optical fiber in copper wire out, for meeting the growing communication users and faster and better service requirements.

The Passive Optical Network (PON) is a point-to-multipoint fiber access technique, as shown in FIG. 1. The passive optical network comprises an Optical Line Terminal (OLT), an Optical Network Unit (ONU) and an Optical Distribution Network (ODN). Generally, the PON is a point-to-multipoint structure that is composed by one OLT connecting with multiple ONUs via the optical power splitter (the splitter) of the ODN, wherein each ONU includes an Optical Network Terminal (ONT) for Fiber To The Home (FTTH), and the ONT is a special form belonging to the ONU definition areas.

In the process of deploying the passive optical network, the operators consider how to meet the growing customer demands for the FTTH and save the investment costs as much as possible. Therefore, it expects that one OLT can drive as many optical network units (ONUs/ONTs) as possible via the ODN, which is required that the splitter in the ODN should increase its splitting ratio. However, although the ONUs would be doubled at each time when the splitting ratio increases, the optical link loss will correspondingly increase 3 dB. Theoretically, the loss of the $1:2^N$ splitter is $3*N$ (the unit is dB), but due to the imperfection of a plurality of production processes and factors such as the fiber coupling loss, the practical loss is $3*N+M$ (in dB). The M value of the $1:2^N$ splitter having the best or minimum loss is generally less than 3 dB. The largest $1:2^N$ splitter supplied on the market is 1:64, that is, N=6. The largest splitter can be provided by most of manufacturers is 1:32, that is, N=5. Therefore, a splitter whose N>6 must be a combination of smaller splitters. The combination may be varied and can have many levels. However, the more the levels are, the more the processes are, and the larger the corresponding loss is. A $1:2^N$ splitter with the minimum loss generally has two levels at most.

FIG. 2, FIG. 3 and FIG. 4 show the best configuration combinations of splitters whose splitting ratios are 1:128, 1:256 and 1:512 respectively, the corresponding losses are $3*(N+1)$, that is, 24 dB, 27 dB and 30 dB. If a 5 km optical distribution network is taken as an example, considering that the loss per kilometer of the fiber is 0.4 dB/km and neglecting other losses, the minimum optical link losses relative to these three splitters are 26 dB, 29 dB and 32 dB. Obviously, the loss of the splitter in the entire optical link loss has the largest proportion, thus selecting a splitter with fewer levels plays a vital role of reducing the loss of the entire optical link in the ODN.

For rural areas or rural-urban fringe areas, since the population density is sparse and scattered, operators hope to have a long distance passive optical network to meet their needs very much, and the distance is in the range of 20 km~60 km. Usually splitters whose splitting ratio is 1:16 is selected. If the fiber loss per kilometer is 0.4 dB/km and other losses are neglected, the losses of 20 km, 40 km and 60 km optical link are 23 dB, 31 dB and 39 dB. Since the long distance PON has a huge optical link loss, the general practice is to add a long-distance box for optical amplification or optical reset in the trunk optical fiber, but such an approach is contrary to the original intention of the passive, that is, it needs to supply power to the long-distance box in the transmission, and thus the operators concern whether there is possibility of meeting long distance requirements without the long-distance box.

No matter whether the passive optical network is the large splitting ratio passive optical network or the large distance passive optical network, the essence is that their optical link losses are enormous, and in order to enable them to run in the optical distribution network, besides setting the best splitter to reduce losses, the corresponding devices for an optical power budget must be provided for them, that is, their optical power budgets must be able to overcome the minimum optical link losses so that the system can run. However, in the existing passive optical network standards, only a few standards such as: IEEE P802.3av (10G Ethernet Passive Optical Network) can provide more than 30 dB optical power budget categories, namely, PR30 and PRX30, as shown in Table 1.

TABLE 1

| IEEE P802.3av optical power budget categories | | | | | | |
| --- | --- | --- | --- | --- | --- | --- |
| | PR10 | PR20 | PR30 | PRX10 | PRX20 | PRX30 |
| Downlink (dB) | 22.5 | 25.5 | 30.5 | 22.5 | 25.5 | 30.5 |
| Uplink (dB) | 23 | 27 | 32 | 23 | 26 | 30.4 |

It can be analyzed from Table 1 that the PR30 or PRX30 optical power budget can only support the less than 10 km distance passive optical network with the best $1:2^N$ (N=7) splitter (that is, the splitting ratio is 1:128), however for an optical distribution network having the larger splitting ratio $1:2^N$ (N>7) or over the 40 km long distance, the PR30 or PRX30 optical power budget is far from enough. Therefore, in order to support the large splitting ratio and long distance passive optical networks, it needs to provide categories with the larger optical power budget and the relevant devices.

SUMMARY OF THE INVENTION

The technical problem to be solved in the present invention is to provide a method and a device for an optical power budget in a passive optical network so as to configure an adaptable optical power budget category and a device thereof for implementing a passive optical network with a large splitting ratio or long distance.

In order to solve the aforementioned technical problem, the present invention provides a method for an optical power budget in a passive optical network, which comprises:

acquiring a corresponding minimum optical link loss according to a transmission requirement of a passive optical network with a large splitting ratio or long distance; and selecting an optical transmitter with large power and an optical receiver with high sensitivity as a combination of an optical transmitter of an Optical Line Terminal (OLT) and an optical receiver of an Optical Network Unit (ONU) in an optical link, as well as a combination of an optical receiver of the OLT and an optical transmitter of the ONU in the optical link according to the minimum optical link loss to compose a passive optical network system comprising the OLT, an Optical Distribution Network (ODN), and ONUs connected in sequence.

Preferably, the minimum optical link loss that is acquired is above 30 dB and below 40 dB.

Preferably, the optical transmitter with large power at least is an optical transmitter whose minimum transmission power is large, and the optical receiver with high sensitivity is an optical receiver of which an absolute value of a maximum sensitivity is large.

Preferably, the optical transmitter with large power further refers to an optical transmitter whose maximum transmission power is large.

Preferably, in the step of selecting the optical transmitter with large power and the optical receiver with high sensitivity according to the minimum optical link loss, a combination of an optical transmitter whose minimum transmission power is small and an optical receiver of which the absolute value of the maximum sensitivity is large is prior to be selected in a premise of meeting a requirement that a result of the minimum transmission power of the optical transmitter minus the maximum sensitivity of the optical receiver is more than or equal to the minimum optical link loss.

Preferably, in the step of selecting the optical transmitter with large power and the optical receiver with high sensitivity, the optical transmitter is a Multiple Quantum Wells Distributed Feedback Laser (DFB) optical transmitter, and the optical receiver is an Avalanche Photo Diode (APD) optical receiver.

Preferably, the passive optical network system uses a Forward Error Control (FEC) technique.

Preferably, the optical link comprises a downlink optical link and an uplink optical link, and the method further comprises:

setting working rates of the optical transmitter of the OLT and/or the optical receiver of the ONU in the downlink optical link so that the working rates of the optical transmitter and/or the optical receiver in the downlink optical link are matched with each other; and/or setting working rates of the optical transmitter of the ONU and/or the optical receiver of the OLT in the uplink optical link so that the working rates of the optical transmitter and/or the optical receiver in the uplink optical link are matched with each other.

Preferably, in the step of selecting the optical transmitter with large power and the optical receiver with high sensitivity according to the minimum optical link loss, when the minimum optical link loss is 39 dB, a combination of a 12 dBm DFB optical transmitter and a −28 dBm APD optical receiver is selected;

when the minimum optical link loss is 35 dB, a combination of a 9 dBm DFB optical transmitter and a −27 dBm APD optical receiver is selected, and/or a combination of a 6 dBm DFB optical transmitter and a −30 dBm APD optical receiver is selected;

when the minimum optical link loss is 33 dB, a combination of a 5 dBm DFB optical transmitter and a −29 dBm APD optical receiver is selected;

when the minimum optical link loss is 31 dB, a combination of a 10.5 dBm DFB optical transmitter and a −21.5 dBm optical receiver is selected, and/or a combination of the 4 dBm DFB optical transmitter and a −28 dBm APD optical receiver is selected.

Preferably, in the step of selecting the optical transmitter with large power and the optical receiver with high sensitivity according to the minimum optical link loss, when the minimum optical link loss is 35 dB, the OLT comprising the 9 dBm DFB optical transmitter and the −30 dBm APD optical receiver, and the ONU comprising the 6 dBm DFB optical transmitter and the −27 dBm APD optical receiver are selected;

when the minimum optical link loss is 31 dB, the OLT comprising the 9 dBm DFB optical transmitter and the −28 dBm APD optical receiver, and the ONU comprising the 4 dBm DFB optical transmitter and the −21.5 dBm optical receiver are selected.

Preferably, in the step of selecting the optical transmitter with large power and the optical receiver with high sensitivity according to the minimum optical link loss, when the minimum optical link loss is 33 dB, the optical transmitter and optical receiver are selected in accordance with parameters of the optical transmitter and the optical receiver provided in a standard IEEE 802.3av.

In order to solve the aforementioned technical problem, the present invention provides a device for an optical power budget in a passive optical network, and the device comprises a budget module and a combination module connected with each other, wherein:

the budget module is configured to: acquire a corresponding minimum optical link loss according to a transmission requirement of a passive optical network with a large splitting ratio or long distance;

the combination module is configured to: select an optical transmitter with large power and an optical receiver with high sensitivity as a combination of an optical transmitter of an Optical Line Terminal (OLT) and an optical receiver of an Optical Network Unit (ONU) in an optical link, as well as a combination of an optical receiver of the OLT and an optical transmitter of the ONU in the optical link according to the minimum optical link loss to compose a passive optical network system comprising the OLT, an Optical Distribution Network (ODN), and ONUs connected in sequence.

Preferably, the combination module is configured to: prior to select a combination of an optical transmitter whose minimum transmission power is small and an optical receiver of which an absolute value of a maximum sensitivity is large in a premise of meeting a requirement that a result of the minimum transmission power of the optical transmitter minus the maximum sensitivity of the optical receiver is more than or equal to the minimum optical link loss.

Preferably, the optical link comprises a downlink optical link and an uplink optical link, the combination module is also configured to: set working rates of the optical transmitter of the OLT and/or the optical receiver of the ONU in the downlink optical link so that the working rates of the optical transmitter and the optical receiver in the downlink optical link are matched with each other; and/or set working rates of the optical transmitter of the ONU and/or the optical receiver of the OLT in the uplink optical link so that the working rates of the optical transmitter and the optical receiver in the downlink optical link are matched with each other.

Preferably, the combination module is configured to: select a combination of a 12 dBm DFB optical transmitter and a −28 dBm APD optical receiver when the minimum optical link loss is 39 dB; select a combination of a 9 dBm DFB optical transmitter and a −27 dBm APD optical receiver, and/or select a combination of a 6 dBm DFB optical transmitter and a −30 dBm APD optical receiver when the minimum optical link loss is 35 dB; select the combination of a 5 dBm DFB optical transmitter and a −29 dBm APD optical receiver when the minimum optical link loss is 33 dB; select a combination of a 10.5 dBm DFB optical transmitter and a −21.5 dBm optical receiver, and/or select a combination of a 4 dBm DFB optical transmitter and a −28 dBm APD optical receiver when the minimum optical link loss is 31 dB.

The method and the device for an optical power budget in the passive optical network transmission in accordance with the present invention select the respective standard or technically feasible optical transmitters with large power and the optical receivers with high sensitivity in the OLT and the ONU to form the relevant combinations, and thus provide the optical power budget categories and devices thereof adapting to optical networks with the large splitting ratio or long distance passive. Therefore, the present invention provides the possibilities for the operators applying in a variety of different scenarios, and also saves a great many investment costs.

PREFERRED EMBODIMENTS OF THE PRESENT INVENTION

Figure 1:
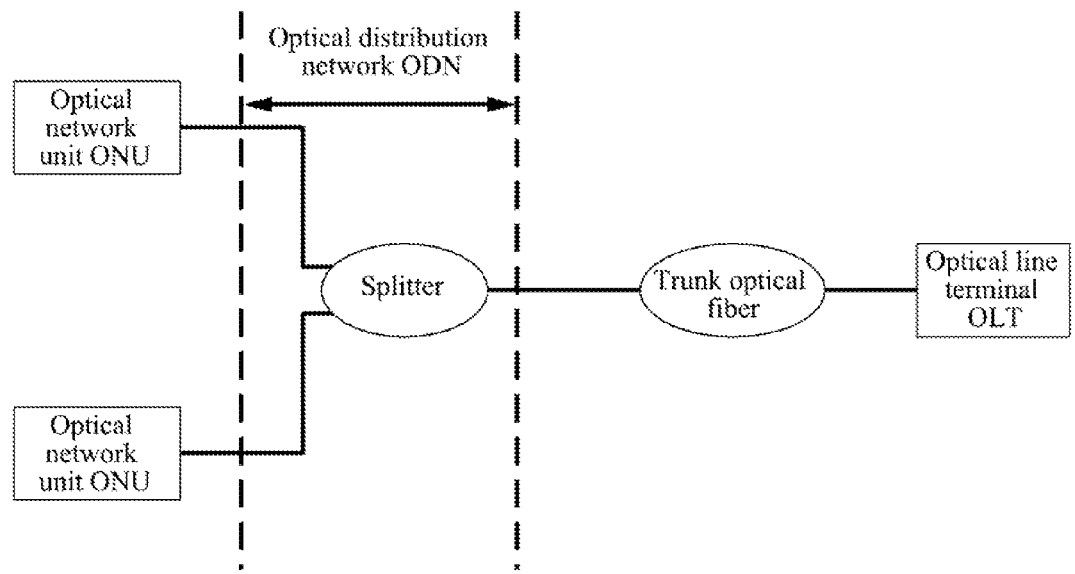
FIG. 1 is a structural schematic diagram of the existing passive optical network.
Figure 2:
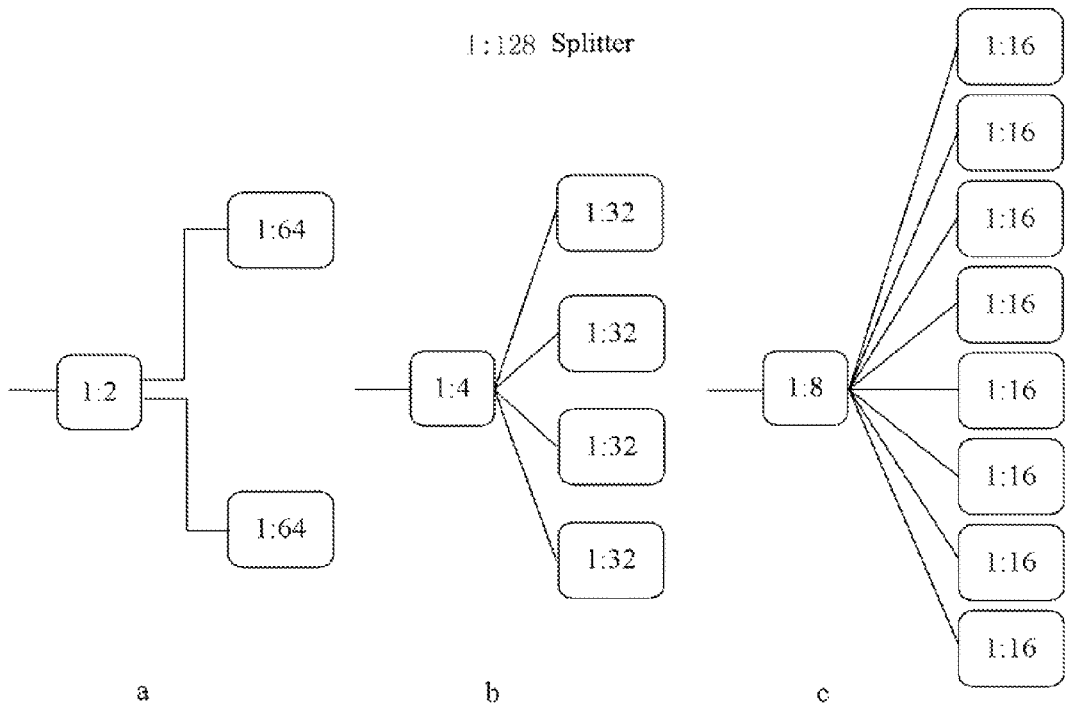
FIG. 2 is a structural schematic diagram of the two-level splitter whose splitting ratio is 1:128.
Figure 3:
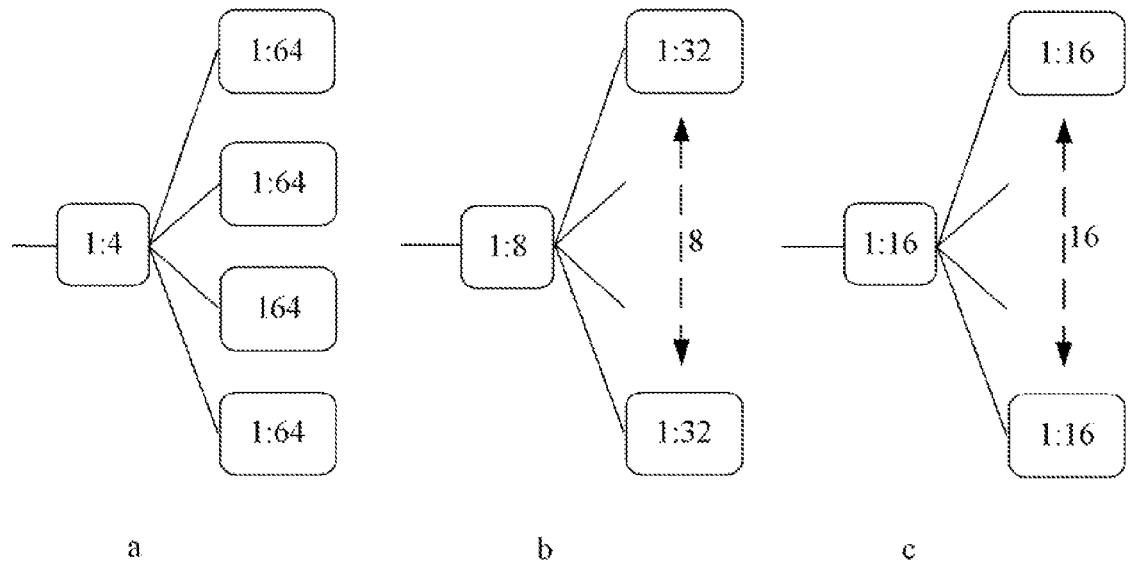
FIG. 3 is a structural schematic diagram of the two-level splitter whose splitting ratio is 1:256.
Figure 4:
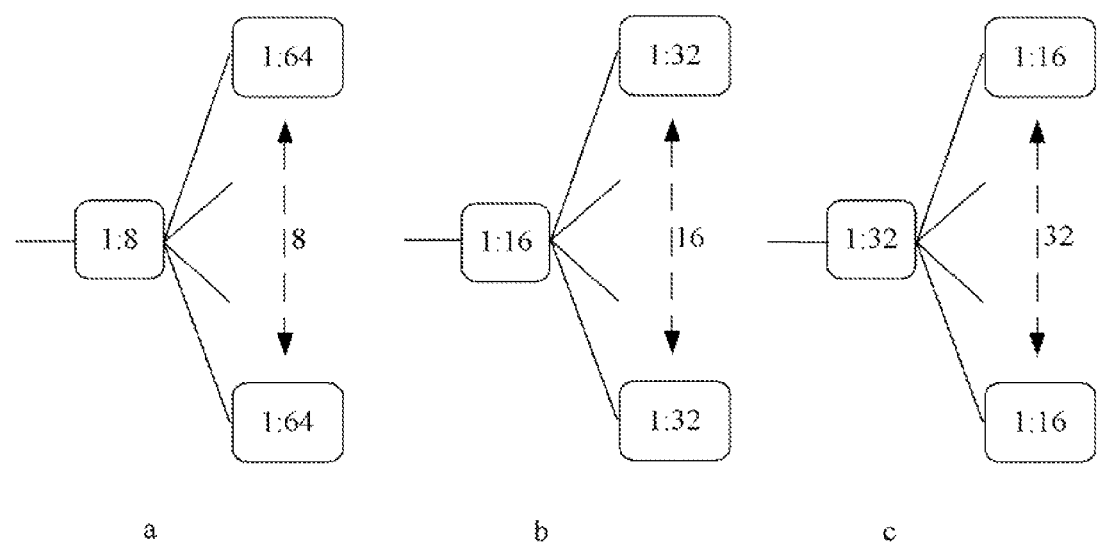
FIG. 4 is a structural schematic diagram of the two-level splitter whose splitting ratio is 1:512.

The optical power budget of the passive optical network, that is, the minimum optical link loss, is determined by the minimum transmission power of the optical transmitter minus the maximum sensitivity of the optical receiver. In order to increase the efficiency and reduce errors, standard organizations such as the IEEE and ITU and so on formulate the relevant standards and define a plurality of optical power budgets, and fix the pairs, that is, when a user selects one optical power budget category, the optical transmitters and optical receivers required by the OLT and ONU are also fixed. However, there is no optical power budget categories adapting to passive optical networks with the large splitting ratio or long distance provided in the existing standards. When a user encounters a plurality of scenarios that need high optical power budgets, and since the relevant standards do not defines the high optical power budgets for scenarios, the users do not know how to pair. For example: a scenario with a large splitting ratio might need two sets of PON systems to meet its needs, and a scenario with a long distance might need a long-distance box. However, this increases in the users' investment and working costs.

In the present invention, the users do not need to constraint themselves in the pairs specified in the standards, they can freely pair according to their needs completely, and the users can search their required pairs of optical power budgets in the optical transmitters and optical receivers specified in the standards, or search the relevant optical transmitters and optical receivers under the conditions allowed by the prior art, as long as the result of the minimum transmission power of the optical transmitter minus the maximum sensitivity of the optical receiver is more than or equal to the required optical power budget (minimum optical link loss).

The present invention proposes to meet the transmission requirements of the passive optical networks with a large splitting ratio or long distance by selecting the optical transmitter with large power and the optical receiver with high sensitivity.

In order to facilitate the users' selection, the optical power budgets involved in the present invention are mainly constraint below 40 dB and above 30 dB, and meanwhile, a plurality of optical power budget categories are illustrated so that the users can easily find the pair thereof. For such a large optical power budget category, the core idea of finding the pair is to pair an optical transmitter with larger power with an optical receiver with high sensitivity. In order to ensure the safety of the laser to the eyes and energy efficiency requirements of the system, to the key point is to reduce the power of the optical transmitter to pair the optical receiver with high sensitivity as much as possible, namely, the key point is prior to pair to select a combination of an optical transmitter whose minimum transmission power is small and an optical receiver of which the absolute value of the maximum sensitivity is large in the premise of meeting the requirement that the result of the minimum transmission power of the optical transmitter minus the maximum sensitivity of the optical receiver is more than or equal to the minimum optical link loss.

The optical transmitter with large power at least refers to an optical transmitter whose minimum transmission power is large, and also can refer to an optical transmitter whose maximum transmission power is large; the high sensitivity optical receiver is an optical receiver of which the absolute value of the maximum sensitivity is large.

Two key devices that can be paired as a high optical power budget are an optical transmitter and an optical receiver. In the following, the performance and power of the optical transmitters are estimated in terms of a plurality of technical feasibilities. First of all, these optical transmitters are typically Multiple Quantum Wells Distributed Feedback Lasers (DFB) transmitters, so that large power can be guaranteed. 20 mW (13 dBm) DFB used is very common and is the most basic according to the prior art and the experience in the bearer network, and most of the device manufacturers can provide 40 mW (16 dBm) DFB. Therefore, the power range applied by the DFB optical transmitter is 4-18 dBm. But the higher the power is, the larger the supply current is required.

There are two types of optical receivers, one is PIN, whose production process is simple and inexpensive but sensitivity is not large, and generally only −20 dBm can be guaranteed; the other is Avalanche Photo Diode (APD), whose production process is relatively complicated and relatively expensive but sensitivity is relatively high, and generally −28 dBm can be reached. Therefore, the present invention can use the APD optical receivers. The APD optical receivers can achieve −34 dBm in the prior art. Besides, the sensitivity is related to the bit error rate as well as the Forward Error Control (FEC), therefore, for the optical power budgets in the present invention, the system of the present invention usually can use the FEC technique. Thus, the working range of the sensitivity of the optical receivers used in the present invention is −28–−34 dBm.

According to the above performance analysis of the optical transmitters and the optical receivers, optical power budget below 40 dB and above 30 dB required by the present invention is feasible. For example: 40 dB optical power budget can be achieve as long as only the 12 dBm DFB transmitter and the −28 dBm APD optical receiver are selected to be paired.

According to the optical power budget below 40 dB and above 30 dB defined in the present invention, there is a plurality of methods for pairing the optical transmitters with the optical receivers to form the optical power budget defined in the present invention. In order to more centralize to use the existing optical device resources, it only needs to divide the optical power budget into multiple levels without performing pairs of the optical power budget of each dB, and then to relatively pair on these multiple levels. The operators can select the relevant levels of optical power budgets according to their needs. Herein, the optical power budgets defined in the present invention are divided into four levels, "31 dB" and "33 dB"; "35 dB" and "39 dB", and these data exclude the transmission and dispersion costs (about 1 dB). Therefore, the result of the power of the optical transmitter minus the sensitivity of the optical receiver equals to the optical power budget level (minimum optical link loss)+1 dB (transmission and dispersion costs). In the following, the four optical power budget levels will be paired in detail and the embodiments are analyzed.

Embodiment 1

"39 dB" optical power budget can select the combination of the 12 dBm (16 mW) DFB optical transmitter and the −28 dBm high sensitivity APD optical receiver. The OLT and the ONUs can be formed by such pairs. Although there is no DFB optical transmitter with large power in the existing PON standards, the products related to these devices have been widely applied to other optical networks, and thus the scheme is technically feasible. Therefore, optical transmitters with large power and APD optical receivers with high sensitivity are needed to be extracted from the original encapsulation and are encapsulated in the optical modules (XFP or SFP devices) according to the access network requirements, and since optical transmitters with high power require more current, more heat is emitted, however, thermal noise affects the sensitivity of the APD optical receivers, and encapsulating such two devices together should consider the adiabatic isolation to reduce the mutual interference therebetween.

With this optical power budget level, 60 km 1:16 splitter does not need a long distance box, or 20 kilometers 1:512 splitting ratio can be obtained.

Embodiment 2

"35 dB" optical power budget can select the combination of the 9 dBm (8 mW) DFB optical transmitter and the −27 dBm high sensitivity APD optical receiver, and/or select the combination of the 6 dBm (4 mW) DFB optical transmitter and the −30 dBm high sensitivity APD optical receiver.

Specifically, the combination in the passive optical network system can be OLT comprising the 9 dBm DFB optical transmitter and the −30 dBm high sensitivity APD optical receiver and the ONU comprising the 6 dBm (4 mW) DFB optical transmitter and the −27 dBm high sensitivity APD optical receiver. This combination is relatively realistic, and the OLT is composed by an optical transmitter with relatively large power and an APD optical receiver with relatively high sensitivity, which is because the OLT can afford a relatively high price; while an ONU is composed by a optical transmitter with relatively small power and an APD optical receiver with relatively low sensitivity, which is because that the ONU is more sensitive to the price. All of these devices can be found in the ITU-T G.984.2 standard. This means that these devices are technically feasible but they are not combined in the standard according to the aforementioned combinations. Of course, the aforementioned combinations are not unique, and other combinations can be selected, as long as the optical power budgets of these combinations can meet the requirements and their devices are feasible.

With this optical power budget level, 50 km 1:16 splitter does not need a long distance box, or 20 kilometers 1:256 splitting ratio can be obtained.

Embodiment 3

"31 dB" optical power budget can select the combination of the 10.5 dBm DFB optical transmitter and the −21.5 dBm sensitivity optical receiver, and/or select the combination of the 4 dBm (3 mW) DFB optical transmitter and the −28 dBm high sensitivity APD optical receiver.

Specifically, the combination in the passive optical network system can be OLT comprising the 10.5 dBm DFB optical transmitter and the −28 dBm high sensitivity APD optical receiver and the ONU comprising the 4 dBm (3 mW) DFB optical transmitter and the −21.5 dBm high sensitivity APD optical receiver. This combination is relatively realistic, and the OLT is composed by an optical transmitter with relatively large power and an APD optical receiver with relatively high sensitivity, which is because the OLT can afford a relatively high price; while the ONU is composed by an optical transmitter with relatively small power and a PIN optical receiver with relatively low sensitivity, which is because that the ONU is more sensitive to the price. All of these devices can be found in the ITU-T G.984.2 and G987.2 standards. This means that these devices are technically feasible, but they are not combined in the standard according to the aforementioned combinations. Of course, the aforementioned combinations are not unique, and other combinations can be selected, as long as the optical power budgets of these combinations can meet the requirements and their devices are feasible.

With this optical power budget level, 40 km 1:16 splitter does not need a long distance box, or 20 kilometers 1:128 splitting ratio can be obtained.

Embodiment 4

"33 dB" optical power budget can select the combination of the 5 dBm DFB optical transmitter and the −29 dBm high sensitivity APD optical receiver. At this time, related devices are directly selected from the existing standards, that is, IEEE802.3av, to be combined practically. Thus two new groups of symmetric and asymmetric optical power budget categories are defined, which will expand the application scope of the original standard and enable users have more selections. Refer to Table 2, as addressed above, the adaptive optical power budget system can be provided for the passive optical network transmission with large splitting ratio in accordance with the combinations of optical modules defined in the IEEE 802.3av.

TABLE 2 the combinations of optical modules defined in the IEEE 802.3av standard

| Optical power budget categories | OLT (transmitter/receiver) | ONU (transmitter/receiver) |
|---|---|---|
| PR10 | 10GBASE-PR-D1 | 10GBASE-PR-U1 |
| PR20 | 10GBASE-PR-D2 | 10GBASE-PR-U1 |
| PR30 | 10GBASE-PR-D3 | 10GBASE-PR-U3 |
| PRX10 | 10/1GBASE-PRX-D1 | 10/1GBASE-PRX-U1 |
| PRX20 | 10/1GBASE-PRX-D2 | 10/1GBASE-PRX-U2 |
| PRX30 | 10/1GBASE-PRX-D3 | 10/1GBASE-PRX-U3 |

Therefore, the embodiments of the present invention break up the combinations of transmitters of OLT and receivers of OLT as well as the combinations of transmitters of ONU and receivers of ONU defined in the original standard IEEE 802.3av, and recombine the transmitters with larger transmission power (including both of the minimum transmission power and the maximum transmission power are relatively large) and the receivers with higher sensitivity (referring that the absolute value of the maximum sensitivity is the largest) so that the downlink and uplink optical power budgets can overcome the minimum optical link loss of the Ethernet passive optical network running in the optical distribution network with the large splitting ratio, and find new optical power budget categories, including the asymmetric mode optical power budget category 10/1 GBASE-PRX30+ (PRX30ext) and the symmetric mode optical power budget category 10 GBASE-PR30+ (PR30ext), that are suitable for the optical distribution network with the large splitting ratio.

The downlink rate of the asymmetric mode optical power budget category PRX30ext is 10.3125 Gbit/s, and the optical power budget of that is 33.5 dB; its uplink rate is 1.25 Gbit/s, and the optical power budget is 33.78 dB. For facilitating comparison, physical parameters of the OLT and ONU are listed in Table 3.

TABLE 3 newly combined asymmetric mode optical power budget category PRX30ext

| OLT physical layer parameters | | ONU physical layer parameters | |
|---|---|---|---|
| Transmitter 10/1GBASE-PRX-D2 | Receiver 10/1GBASE-PRX-D3 | Transmitter 10GBASE-PR-U3 | Receiver 10/1GBASE-PRX-U3 |
| Transmission power 5~9 dBm | Maximum reception power −9.38 dBm | Transmission power 4~9 dBm | Maximum reception power −10 dBm |
| Transmission wavelength 1575~1580 nm | Reception wavelength 1260~1360 nm | Transmission wavelength 1260~1280 nm | Reception wavelength 1575~1580 nm |
| Working rate 10.3125 ± 100 ppm (GBd) | Working rate 1.25 ± 100 ppm (GBd) | Redefinition of the working rate 1.25 ± 100 ppm (GBd) | Working rate 10.3125 ± 100 ppm (GBd) |
| | Maximum sensitivity −29.78 dBm | | Maximum sensitivity −28.50 dBm |

Figure 5:
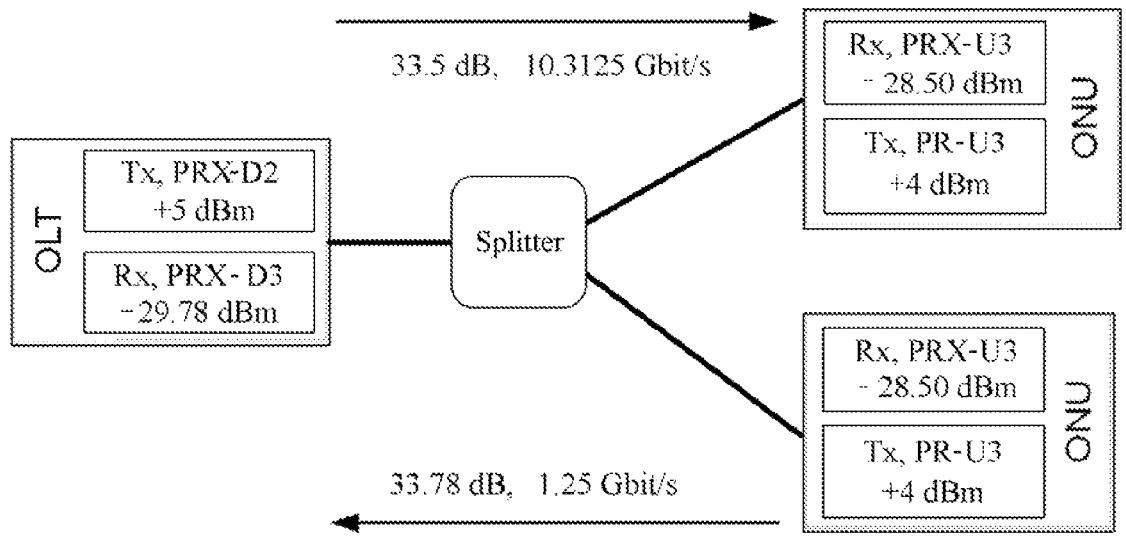
FIG. 5 is a structural schematic diagram of the Ethernet passive optical network system composed by the optical power budget 10/1 GBASE-PRX30+ category in accordance with an embodiment of the present invention.

The 10G Ethernet passive optical network system formed by the combination of the OLT, ONU in the PRX30ext optical power budget category and the splitter is shown in FIG. 5, and the system comprises the downlink optical link and the uplink optical link; wherein the downlink optical link comprises:

the transmitter Tx 10/1 GBASE-PRX-D2 of the OLT, which is used to transmit the downlink signal to the splitter, and it has relatively large transmission power, that is, the transmission power range is 5~9 dBm;

the splitter, which is used to: split the optical power of the downlink signal transmitted by the transmitter 10/1 GBASE-PRX-D2 of the OLT to different receivers 10/1 GBASE-PRX-U3s of the ONU, and its maximum splitting ratio can reach 1:512; and the receiver Rx 10/1 GBASE-PRX-U3 of the ONU, which is used to: receive the downlink signal from the splitter, and it has relatively good receiving signal sensitivity (the absolute value of the receiving signal sensitivity is large), that is, the maximum sensitivity of the receiving signal is −28.50 dBm.

The downlink optical power budget is the minimum transmission power of the Transmitter of the OLT minus the maximum sensitivity of the receiver of ONU, that is: the downlink optical power budget value=5−(−28.5)=33.5 dB.

The downlink working rate is 10.3125 Gbit/s, and the working wavelength is 1577 nm.

The required minimum downlink optical link loss is the maximum transmission power of the transmitter of OLT minus the maximum reception power of the receiver of ONU, that is, the minimum downlink optical link loss value= 9−(−10)=19 dB; this means that if the downlink optical link loss is less than 19 dB, the receiver of ONU will be damaged. The system does not support to run in this ODN.

The uplink optical link comprises:

the transmitter Tx of ONU, 10 GBASE-PR-U3, which is used to transmit the uplink signal to the splitter, and it has relatively large transmission power, that is, its transmission power range is 4-9 dBm, and in order to adapt to the working rate of the receiver of OLT, and the working rate of the transmitter of ONU is redefined as 1.25 Gbit/s;

the splitter, which is used to: split the optical power of the uplink signal transmitted by the transmitter 10 GBASE-PR-U3 of ONU into the receiver 10/1 GBASE-PRX-D3 of OLT, and the maximum splitting ratio can reach 1:512; and the receiver Rx of OLT, 10/1 GBASE-PRX-D3, which is used to receive the uplink signal from the splitter, the maximum sensitivity of the receiving signal is −29.78 dBm, and its reception working rate is 1.25 Gbit/s.

The uplink optical power budget is the minimum transmission power of the transmitter of ONU minus the maximum sensitivity of the receiver of OLT, that is: the uplink optical power budget value=4−(−29.78)=33.78 dB;

The uplink working rate is 1.25 Gbit/s, and the working wavelength is 1270 nm; wherein the transmitter of ONU is to pair the receiver of OLT, and the rate will be re-adjusted. Rate pairing principle is to adjust the high rate receiver to be consistent with the low rate transmitter, and/or to adjust the high rate transmitter to be consistent with the low rate receiver.

The required minimum uplink optical link loss is the maximum transmission power of the transmitter of ONU minus the maximum reception power of the receiver of OLT, that is: the minimum uplink optical link loss value=9−(−9.38)=18.38 dB; this means that if the uplink optical link loss is less than 18.38 dB, the receiver of OLT will be damaged, the system does not support to run in this ODN.

The downlink rate of the symmetric mode optical power budget category PR30ext is 10.3125 Gbit/s, and the optical power budget is 33.5 dB; the uplink rate of that is 10.3125 Gbit/s, and the optical power budget is 32.0 dB. For facilitating comparison, physical parameters of the OLT and ONU are listed in Table 4.

TABLE 4 newly combined symmetric mode optical power budget category PR30ext

| OLT physical layer parameters | | ONU physical layer parameters | |
|---|---|---|---|
| Transmitter 10GBASE-PR-D2 | Receiver 10GBASE-PR-D3 | Transmitter 10GBASE-PR-U3 | Receiver 10GBASE-PR-U3 |
| Transmission power 5~9 dBm | Maximum reception power −6.0 dBm | Transmission power 4~9 dBm | Maximum reception power −10.0 dBm |
| Transmission wavelength 1575~1580 nm | Reception wavelength 1260~1280 nm | Transmission wavelength 1260~1280 nm | Reception wavelength 1575~1580 nm |
| Working rate 10.3125 ± 100 ppm (GBd) | Working rate 10.3125 ± 100 ppm (GBd) Maximum sensitivity −28.0 dBm | Working rate 10.3125 ± 100 ppm (GBd) | Working rate 10.3125 ± 100 ppm (GBd) Maximum sensitivity −28.50 dBm |

Figure 6:
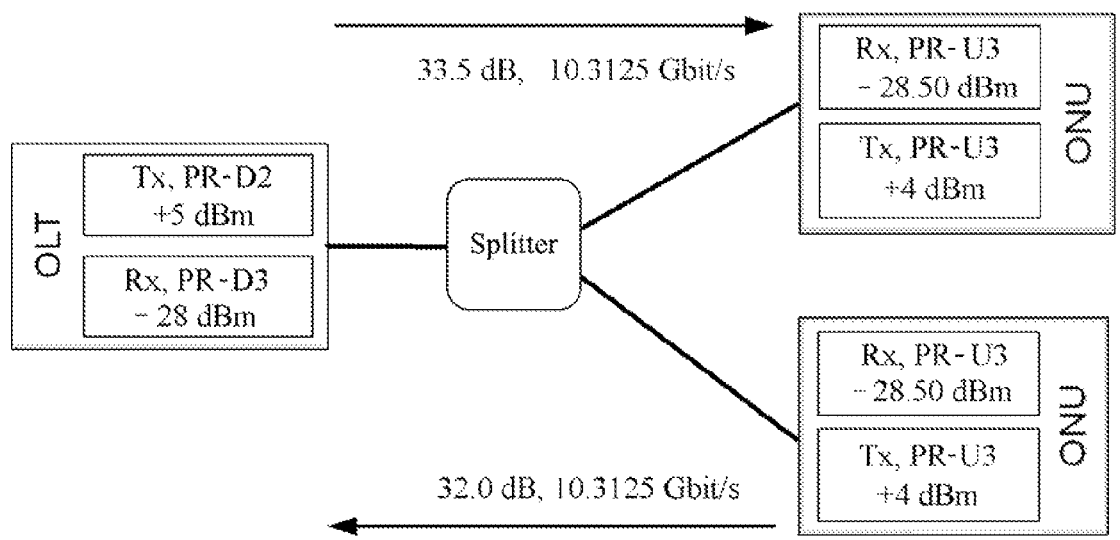
FIG. 6 is a structural schematic diagram of the Ethernet passive optical network system composed by the optical power budget 10/1 GBASE-PR30+ category in accordance with an embodiment of the present invention.

The 10G Ethernet passive optical network system formed by the combination of the OLT and the ONU in the PR30ext optical power budget category and the splitter is shown in FIG. 6, and the system comprises the downlink optical link and the uplink optical link; wherein the downlink optical link comprises:

the transmitter Tx of OLT, 10 GBASE-PR-D2, which is used to transmit the downlink signal to the splitter, and its transmission power range is 5~9 dBm;

the splitter, which is used to split optical power of the downlink signal transmitted by the transmitter 10 GBASE-PR-D2 of OLT into different receivers 10 GBASE-PR-U3 of ONU, and the splitting ratio is up to 1:512; and the receiver Rx of ONU, 10 GBASE-PR-U3, which is used to receive the downlink signal from the splitter, and the maximum sensitivity of the receiving signal is −28.50 dBm.

The downlink optical power budget is the minimum transmission power of the transmitter of OLT minus the maximum sensitivity of the receiver of ONU, that is: the downlink optical power budget value=5−(−28.5)=33.5 dB.

The downlink working rate is 10.3125 Gbit/s, and the working wavelength is 1577 nm;

The required minimum downlink optical link loss is the maximum transmission power of the transmitter of OLT minus the maximum power received by the receiver of ONU, that is: the minimum downlink optical link loss value= 9−(−10)=19 dB; this means that if the downlink optical link loss is less than 19 dB, the receiver of ONU will be damaged, the system does not support to run in this ODN.

The uplink optical link comprises:

the transmitter Tx of ONU, 10 GBASE-PR-U3, which is used to transmit the uplink signal to the splitter, and its transmission power range is 4-9 dBm, and the transmission working rate is 10.3125 Gbit/s;

the splitter, which is used to split the optical power of the uplink signal transmitted by the transmitter 10 GBASE-PR-U3 of ONU into the receiver 10 GBASE-PR-D3 of OLT, and its maximum splitting ratio is 1:512; and the receiver Rx of OLT, 10 GBASE-PR-D3, which is used to receive the uplink signal from the splitter, the maximum sensitivity of the receiving signal is −28 dBm, and the reception working rate is 10.3125 Gbit/s.

The uplink optical power budget is the minimum transmission power of the transmitter of ONU minus the maximum sensitivity of the receiver of OLT, that is: the uplink optical power budget value=4−(−28)=32 dB;

the uplink working rate is 10.3125 Gbit/s, and the working wavelength is 1270 nm;

the required minimum uplink optical link loss is the maximum transmission power of the transmitter of ONU minus the reception maximum power of the receiver of OLT, that is: the minimum uplink optical link loss value=9−(−6)=15 dB; this means that if uplink optical link loss is less than 15 dB, the receiver of OLT will be damaged, the system does not support to run in this ODN.

Since the symmetric and asymmetric 10G Ethernet passive optical network systems composed by the PR30ext optical power budget category and the PRX30ext optical power budget category are composed by the laser transmitter with large power and the receiver with high sensitivity, they have a requirement for the minimum optical link loss. According to the aforementioned physical parameters, the minimum ODN optical link loss received in the uplink and the downlink is 19 dB, that is, the 1:64 splitting ratio at least can be acquired in 5 kilometers. The optical transmission distance should be extended to obtain a splitting ratio less than 1:64; for example, the 1:32 splitting ratio can be run in the 10 km ODN at least.

The PRX30ext has the 33 dB optical power budget at least in the uplink and the downlink, and the PR30ext has the 32 dB optical power budget at least in the uplink and the downlink (usually there is a certain margin, thus the 32 dB optical power budget is regarded as belonging to the "33 dB" optical power budget. Moreover, the standards define that the power of the transmitter with such a wavelength is 4-9 dBm, while the transmitter with another wavelength is 5~9 dBm. Therefore, there is no reason to believe that the power of the transmitter with this wavelength cannot be 5-9 dBm. When calculating according to 5~9 dBm, the PR30ext has 33 dB in the uplink and the downlink), whether they meet the requirements of the ODN with a large splitting ratio and whether they can afford the maximum splitting ratio (1:512) and the corresponding maximum transmission distance should calculate their own optical link loss budgets respectively. In the following, only the PRX30ext optical link loss budget is taken as example, and the PR30ext optical link loss budget is similar.

The calculation is performed according to the fiber loss per kilometer 0.4 dB/km, and for the PRX30ext category, the following budget examples are given.

Example 1: for the 1:128 ODN, the splitter loss is 24 dB, it is considered that the loss of the ODN for transmitting 20 km is 8 dB, 8 dB+24 dB=32 dB, which is less than 33 dB, and thus the scheme is feasible.

Example 2: for the 1:256 ODN, the splitter loss is 27 dB, it is considered that the loss of the ODN for transmitting 12 km is 4.8 dB, 4.8 dB+27 dB=31.8 dB, which is less than 33 dB, and thus the scheme is feasible.

Example 3: for the 1:512 ODN, the splitter loss is 30 dB, it is considered that the loss of the ODN for transmitting 5 km is 2 dB, 2 dB+30 dB=32 dB, which is less than 33 dB, and thus the scheme is feasible.

Therefore, this new optical power budget category PRX30ext can support ODN with the maximum 1:512 splitting ratio under the loss of the best splitter, and it can transmit 5 km distance at least. Similarly, in this 5 km distance, the minimum supported splitting ratio is 1:64. All of the above optical power calculation does not consider the benefits of the FEC. If the FEC is considered, generally there is 1.5 dB more power budget, thus the above budget calculation is more realistic and feasible.

Figure 7:
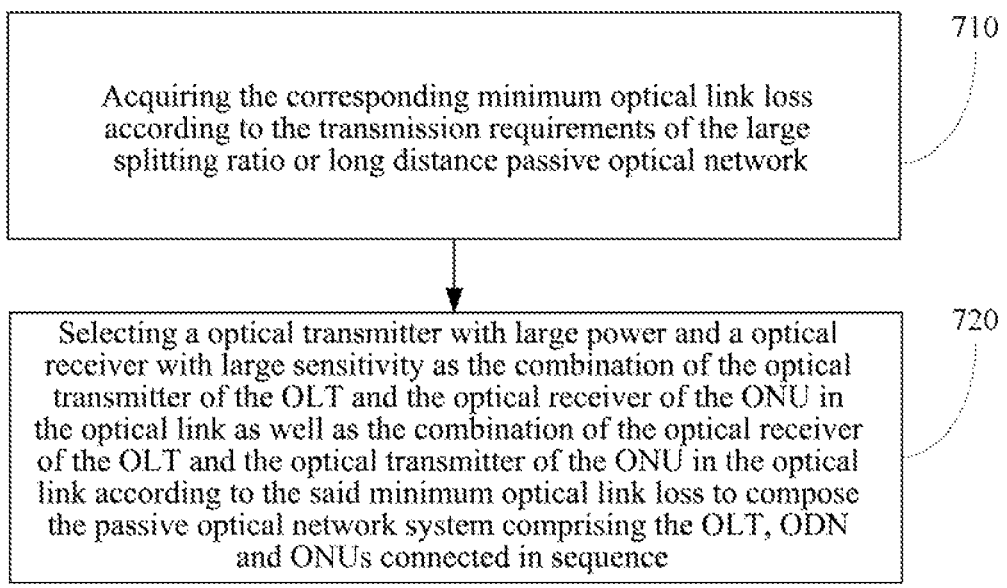
FIG. 7 is a flow chart of the method embodiment for an optical power budget in the passive optical network transmission in accordance with the present invention.

Based on the above embodiments and examples, a flow of the method embodiment for an optical power budget in the passive optical network is provided, as shown in FIG. 7, and the flow comprises the following steps:

710: the corresponding minimum optical link loss is acquired according to the transmission requirements of the passive optical network with the large splitting ratio or long distance;

wherein the minimum optical link loss can be calculated and acquired according to the parameters such as the splitter loss of 30 dB and the fiber loss per kilometer;

720: optical transmitters with large power and optical receivers with higher sensitivity are selected as the combination of the optical transmitter of OLT and the optical receiver of ONU in the optical link as well as the combination of the optical receiver of OLT and the optical transmitter of ONU in the optical link according to the minimum optical link loss to compose the passive optical network system comprising the OLT, ODN and ONUs connected in sequence;

for example, for the "33 dB" optical power budget, transmitters and receivers can be selected according to the transmitter and receiver parameters provided in the IEEE 802.3 av standard.

In addition, in the composed passive optical network system, the transmission working rate should match with the reception working rate, that is, the working rates of the optical transmitter of OLT and/or the optical receiver of ONU in the downlink optical link are set, so that the working rate of the optical transmitter matches with the working rate of the optical receiver in the downlink optical link; and/or, the working rates of the optical transmitter of ONU and/or the optical receiver of OLT in the uplink optical link are set, so that the working rate of the optical transmitter matches with the working rate of the optical receiver in the uplink optical link.

For example, in order to adapt to the working rate 1.25 Gbit/s of the receiver 10/1 GBASE-PRX-D3 of OLT, the working rate of the transmitter 10 GBASE-PR-U3 of ONU in the PRX30ext uplink optical link is re-defined as 1.25 Gbit/s.

Accordingly, the device for an optical power budget in the passive optical network in accordance with the embodiments of present invention comprises a budget module 81 and a combination module 82 that are connected, wherein:

the budget module 81 is configured to: acquire the corresponding minimum optical link loss according to the transmission requirements of a passive optical network with a large splitting ratio or long distance;

the combination module 82 is configured to: select optical transmitters with large power and optical receivers with high sensitivity as the combination of the optical transmitter of OLT and the optical receiver of ONU in the optical link, as well as the combination of the optical receiver of OLT and the optical transmitter of ONU in the optical link according to the minimum optical link loss acquired by the budget module 81 to compose a passive optical network system comprising the OLT, ODN and ONUs connected in sequence.

Preferably, the combination module 82 is configured to: prior to select a combination of an optical transmitter whose minimum transmission power is small and an optical receiver of which the absolute value of the maximum sensitivity is large in the premise of meeting the requirement that the result of the minimum transmission power of the optical transmitter minus the maximum sensitivity of the optical receiver is more than or equal to the minimum optical link loss.

The optical link comprises the downlink optical link and the uplink optical link, and the combination module 82 is also configured to: set the working rates of the optical transmitter of OLT and/or the optical receiver of ONU in the downlink optical link so that the working rates of the optical transmitter and/or the optical receiver in the downlink optical link are matched with each other; and/or set the working rates of the optical transmitter of OLT and/or the optical receiver of ONU in the uplink optical link so that the working rates of the optical transmitter and/or the optical receiver in the downlink optical link are matched with each other.

Preferably, the combination module 82 is configured to: select the combination of the 12 dBm DFB optical transmitter and the −28 dBm APD optical receiver when the minimum optical link loss is 39 dB; select the combination of the 9 dBm DFB optical transmitter and the −27 dBm APD optical receiver and/or select the combination of the 6 dBm DFB optical transmitter and the −30 dBm APD optical receiver when the minimum optical link loss is 35 dB; select the combination of the 5 dBm DFB optical transmitter and the −29 dBm APD optical receiver when the minimum optical link loss is 33 dB; select the combination of the 10.5 dBm DFB optical transmitter and the −21.5 dBm optical receiver and/or select the combination of the 4 dBm DFB optical transmitter and the −28 dBm APD optical receiver when the minimum optical link loss is 31 dB.

Although the present invention is described with combination of the specific embodiments, for those skilled in the field, modifications and variations can be made to the present invention without departing from the spirit and essence of the present invention, and such modification or variations should belong to the scope of the present invention and the scope of the claims of the present invention.

INDUSTRIAL APPLICABILITY

The present invention provides a method and a device for an optical power budget in the passive optical network transmission, which select the transmitters with large power and the receivers with high sensitivity as the respective combinations of the transmitters and in receivers the OLT and the ONU, and thus provide the optical power budget categories and devices thereof adapting to splitters with the large splitting ratio, so as to not only enable the splitter to drive as many optical network units as possible, but also be able to reduce the loss of the splitter to the minimal loss, thereby effectively reducing the loss of the whole optical link. Therefore, the present invention can save a great many investment costs for operators.

What is claimed is:

1. An optical power budget method in a passive optical network, comprising:

an optical power budget device selecting at least one group of an optical transmitter and an optical receiver from a set of optical transmitters with a power range of 4-18 dBm and a set of optical receivers with a working range of sensitivity of −20--34 dBm to meet a requirement that a result of the minimum transmission power of the selected optical transmitter minus the maximum sensitivity of the selected optical receiver is more than or equal to a minimum optical link loss, wherein the minimum optical link loss is acquired according to a transmission requirement of the passive optical network with a splitting ratio $1:2^N$ in which N≥7 or a long distance which is more than or equal to 40 km;

wherein, when the minimum optical link loss is 39 dB, a combination of a 12 dBm DFB optical transmitter and a −28 dBm APD optical receiver is selected; when the minimum optical link loss is 35 dB, a combination of a 9 dBm DFB optical transmitter and a −27 dBm APD optical receiver is selected, and/or a combination of a 6 dBm DFB optical transmitter and a −30 dBm APD optical receiver is selected; when the minimum optical link loss is 33 dB, a combination of a 5 dBm DFB optical transmitter and a −29 dBm APD optical receiver is selected; when the minimum optical link loss is 31 dB, a combination of a 10.5 dBm DFB optical transmitter and a −21.5 dBm optical receiver is selected, and/or a combination of the 4 dBm DFB optical transmitter and a −28 dBm APD optical receiver is selected;

wherein, the at least one group of the selected optical transmitter and the selected optical receiver is acted as a combination of an optical transmitter of an Optical Line Terminal (OLT) and an optical receiver of an Optical Network Unit (ONU) in a downstream optical link and a combination of an optical receiver of the OLT and an optical transmitter of the ONU in an upstream optical link.

2. The method of claim 1, wherein:
the acquired minimum optical link loss is above 30 dB and below 40 dB.

3. The method of claim 2, wherein:
the optical link comprises a downlink optical link and an uplink optical link, and the method further comprises:
setting working rates of the optical transmitter of the OLT and/or the optical receiver of the ONU in the downlink optical link so that the working rates of the optical transmitter and/or the optical receiver in the downlink optical link are matched with each other; and/or setting working rates of the optical transmitter of the ONU and/or the optical receiver of the OLT in the uplink optical link so that the working rates of the optical transmitter and/or the optical receiver in the uplink optical link are matched with each other.

4. The method of claim 1, further comprising:
when the at least one group of the selected optical transmitter and the selected optical receiver is two or more groups, selecting one group of an optical transmitter and an optical receiver in the two or more groups, wherein, in this one group, the minimum transmission power of the optical transmitter smaller than those of the optical transmitters in the other groups, and the maximum sensitivity of the optical receiver larger than those of the optical receivers in the other groups.

5. The method of claim 1, wherein:
the selected optical transmitter is a Multiple Quantum Wells Distributed Feedback Laser (DFB) optical transmitter, and the selected optical receiver is an Avalanche Photo Diode (APD) optical receiver.

6. The method of claim 1, wherein:
the passive optical network system uses a Forward Error Control (FEC) technique.

7. The method of claim 1, wherein:
the optical link comprises a downlink optical link and an uplink optical link, and the method further comprises:
setting working rates of the optical transmitter of the OLT and/or the optical receiver of the ONU in the downlink optical link so that the working rates of the optical transmitter and/or the optical receiver in the downlink optical link are matched with each other; and/or setting working rates of the optical transmitter of the ONU and/or the optical receiver of the OLT in the uplink optical link so that the working rates of the optical transmitter and/or the optical receiver in the uplink optical link are matched with each other.

8. The method of claim 1, wherein:
when the minimum optical link loss is 35 dB, the OLT comprises the 9 dBm DFB optical transmitter and the −30 dBm APD optical receiver, and the ONU comprises the 6 dBm DFB optical transmitter and the −27 dBm APD optical receiver are selected;
when the minimum optical link loss is 31 dB, the OLT comprises the 9 dBm DFB optical transmitter and the −28 dBm APD optical receiver, and the ONU comprises the 4 dBm DFB optical transmitter and the −21.5 dBm optical receiver are selected.

9. The method of claim 1, wherein: in the step of selecting at least one group of an optical transmitter and an optical receiver from a set of optical transmitters with a power range of 4-18 dBm and a set of optical receivers with a working range of sensitivity of −20-−34 dBm to meet a requirement that a result of the minimum transmission power of the selected optical transmitter minus the maximum sensitivity of the selected optical receiver is more than or equal to a minimum optical link loss, when the minimum optical link loss is 33 dB, the optical power budget device determines two optical power budget categories including an asymmetric mode optical power budget category 10/1 GBASE-PRX30+, PRX30ext, and a symmetric mode optical power budget category 10 GBASE-PR30+, PR30ext;
in the PRX30ext, selects a combination of a transmitter Tx 10/1 GBASE-PRX-D2 for the OLT and a receiver Rx 10/1 GBASE-PRX-U3 for the ONU in a downlink optical link, and selects a combination of a transmitter Tx 10 GBASE-PR-U3 for the ONU and a receiver Rx 10/1 GBASE-PRX-D3 for the OLT in an uplink optical link;
in the PR30ext, selects a combination of a transmitter Tx 10 GBASE-PR-D2 for the OLT and a receiver Rx 10 GBASE-PR-U3 for the ONU in a downlink optical link, and selects a combination of a transmitter Tx 10 GBASE-PR-U3 for the ONU and a receiver Rx 10 GBASE-PR-D3 for the OLT in an uplink optical link.

10. An optical power budget device in a passive optical network, comprising a processor which comprises a budget module and a combination module connected with each other, wherein:
the budget module is configured to =acquire a minimum optical link loss according to a transmission requirement of the passive optical network with a splitting ratio $1:2^N$ in which $N \geq 7$ or a long distance which is more than or equal to 40 km;
the combination module is configured to =select at least one group of an optical transmitter and an optical receiver from a set of optical transmitters with a power range of 4-18 dBm and a set of optical receivers with a working range of sensitivity of −20-−34 dBm to meet a requirement that a result of the minimum transmission power of the selected optical transmitter minus the maximum sensitivity of the selected optical receiver is more than or equal to the minimum optical link loss; and
the combination module is further configured to: select a combination of a 12 dBm DFB optical transmitter and a −28 dBm APD optical receiver when the minimum optical link loss is 39 dB; select a combination of a 9 dBm DFB optical transmitter and a −27 dBm APD optical receiver, and/or select a combination of a 6 dBm DFB optical transmitter and a −30 dBm APD optical receiver when the minimum optical link loss is 35 dB; select the combination of a 5 dBm DFB optical transmitter and a −29 dBm APD optical receiver when the minimum optical link loss is 33 dB; select a combination of a 10.5 dBm DFB optical transmitter and a −21.5 dBm optical receiver, and/or select a combination of a 4 dBm DFB optical transmitter and a −28 dBm APD optical receiver when the minimum optical link loss is 31 dB;
wherein, the at least one group of the selected optical transmitter and the selected optical receiver is acted as a combination of an optical transmitter of an Optical Line Terminal (OLT) and an optical receiver of an Optical Network Unit (ONU) in an optical link and a combination of an optical receiver of the OLT and an optical transmitter of the ONU in the optical link.

11. The optical power budget device of claim 10, wherein:
the combination module is further configured to, when the at least one group of the selected optical transmitter and the selected optical receiver is two or more groups, select one group of an optical transmitter and an optical receiver in the two or more groups, wherein, in this one group, the minimum transmission power of the optical transmitter is smaller than those of the optical transmitters in the other groups, and the maximum sensitivity of the optical receiver is larger than those of the optical receivers in the other groups.

12. The optical power budget device of claim 10, wherein:
the optical link comprises a downlink optical link and an uplink optical link,
the combination module is also configured to: set working rates of the optical transmitter of the OLT and/or the optical receiver of the ONU in the downlink optical link so that the working rates of the optical transmitter and the optical receiver in the downlink optical link are matched with each other; and/or set working rates of the optical transmitter of the ONU and/or the optical receiver of the OLT in the uplink optical link so that the working rates of the optical transmitter and the optical receiver in the downlink optical link are matched with each other.

13. The optical power budget device of claim 10, wherein:
when the minimum optical link loss is 35 dB, the OLT comprises the 9 dBm DFB optical transmitter and the −30 dBm APD optical receiver, and the ONU comprises the 6 dBm DFB optical transmitter and the −27 dBm APD optical receiver are selected;
when the minimum optical link loss is 31 dB, the OLT comprises the 9 dBm DFB optical transmitter and the −28 dBm APD optical receiver, and the ONU comprises the 4 dBm DFB optical transmitter and the −21.5 dBm optical receiver are selected.

14. The optical power budget device of claim 10, wherein:
the combination module is further configured to:
determine two optical power budget categories including an asymmetric mode optical power budget category 10/1 GBASE-PRX30+, PRX30ext, and a symmetric mode optical power budget category 10 GBASE-PR30+, PR30ext;
in the PRX30ext, select a combination of a transmitter Tx 10/1 GBASE-PRX-D2 for the OLT and a receiver Rx 10/1 GBASE-PRX-U3 for the ONU in a downlink optical link, and select a combination of a transmitter Tx 10 GBASE-PRX-U3 for the ONU and a receiver Rx 10/1 GBASE-PRX-D3 for the OLT in an uplink optical link;
in the PR30ext, select a combination of a transmitter Tx 10 GBASE-PR-D2 for the OLT and a receiver Rx 10 GBASE-PR-U3 for the ONU in a downlink optical link, and select a combination of a transmitter Tx 10 GBASE-PR-U3 for the ONU and a receiver Rx 10 GBASE-PR-D3 for the OLT in an uplink optical link.

* * * * *